United States Patent
Mohammed et al.

(10) Patent No.: US 12,270,713 B2
(45) Date of Patent: Apr. 8, 2025

(54) HEAT EXCHANGER DIFFERENTIAL OIL TEMPERATURE DETERMINATION

(71) Applicant: Pratt & Whitney Canada Corp., Longueuil (CA)

(72) Inventors: Kashif Mohammed, Brossard (CA); Robin Watt, Burlington (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 18/454,160

(22) Filed: Aug. 23, 2023

(65) Prior Publication Data
US 2025/0067602 A1    Feb. 27, 2025

(51) Int. Cl.
G01K 3/14 (2006.01)
F02C 3/04 (2006.01)
F02C 7/12 (2006.01)
G01K 5/52 (2006.01)

(52) U.S. Cl.
CPC .......... *G01K 3/14* (2013.01); *F02C 3/04* (2013.01); *F02C 7/12* (2013.01); *G01K 5/52* (2013.01); *F05D 2260/20* (2013.01)

(58) Field of Classification Search
CPC ...... F02C 3/04; F02C 7/12; F02C 7/14; F02C 7/16; F02C 7/18
See application file for complete search history.

(56) References Cited

U.S. PATENT DOCUMENTS

| | | | |
|---|---|---|---|
| 10,684,176 B2 | 6/2020 | Sato et al. | |
| 11,976,595 B1* | 5/2024 | Mohammed | F02C 7/14 |
| 2010/0242492 A1* | 9/2010 | Sloat | F02K 3/105 60/39.83 |
| 2014/0326058 A1* | 11/2014 | Broughton | F01D 21/003 73/112.01 |
| 2017/0336149 A1 | 11/2017 | Ribarov et al. | |
| 2020/0332715 A1* | 10/2020 | Ribarov | F02C 7/14 |

(Continued)

FOREIGN PATENT DOCUMENTS

| | | | | |
|---|---|---|---|---|
| CA | 3025543 A1 * | 6/2019 | | F01D 5/06 |
| CA | 3136849 A1 * | 10/2020 | | F01N 3/021 |

(Continued)

OTHER PUBLICATIONS

European Search Report for EP Application No. 24195617.6 dated Jan. 20, 2025.

*Primary Examiner* — Craig Kim
(74) *Attorney, Agent, or Firm* — Carlson, Gaskey & Olds, P.C.

(57) ABSTRACT

A gas turbine engine includes a compressor section and a turbine section. A heat exchanger is operable to cool a fluid utilized by a component of the gas turbine engine. The heat exchanger has an inlet and an outlet for the accessory fluid. A strain gauge is associated with the fluid inlet and operable to produce a signal indicative of a temperature of the fluid at the fluid inlet and a strain gauge is associated with the fluid outlet and operable to produce a signal indicative of a temperature of the fluid at the fluid outlet. A controller determines a temperature differential across the heat exchanger by utilizing the signal from the strain gauge at the fluid inlet and the signal from the strain gauge at the fluid outlet. A method and a heat exchanger are also disclosed.

16 Claims, 3 Drawing Sheets

(56) References Cited

U.S. PATENT DOCUMENTS

| | | | |
|---|---|---|---|
| 2021/0109048 A1* | 4/2021 | Ambs | G01N 25/26 |
| 2021/0229827 A1* | 7/2021 | Doman | F02C 7/14 |
| 2021/0293598 A1* | 9/2021 | Mahalingam | G01N 9/002 |
| 2022/0145834 A1* | 5/2022 | Schickler | F02M 26/35 |
| 2022/0298968 A1* | 9/2022 | Forsdike | F02C 7/12 |
| 2022/0307419 A1* | 9/2022 | Wolfe | F01P 1/00 |
| 2022/0341790 A1 | 10/2022 | Toda et al. | |
| 2023/0054112 A1* | 2/2023 | Rollins | B01F 35/21 |
| 2024/0250077 A1* | 7/2024 | Sun | H01L 33/483 |

FOREIGN PATENT DOCUMENTS

| | | | | |
|---|---|---|---|---|
| CN | 110307051 A | * | 10/2019 | F01D 21/003 |
| EP | 3620983 A1 | * | 3/2020 | G05B 23/024 |
| GB | 2245709 A | * | 1/1992 | G01B 7/18 |
| JP | S6130732 A | | 2/1986 | |
| JP | 2006300637 A | | 11/2006 | |
| JP | 2019-100696 A | | 6/2019 | |
| WO | 2022/122926 A1 | | 6/2022 | |
| WO | WO-2023196553 A1 | * | 10/2023 | B01D 53/265 |

\* cited by examiner

HEAT EXCHANGER DIFFERENTIAL OIL TEMPERATURE DETERMINATION

BACKGROUND

This application relates to a method and apparatus for determining a differential fluid temperature across a heat exchanger.

Gas turbine engines are known, and typically include a propulsor delivering air as propulsion and into a core engine. The core engine air is compressed in a compressor and delivered into a combustor where it is mixed with fuel and ignited. Products of the combustion pass downstream over turbine rotors, driving them to rotate.

Many associated accessory systems are required for operation of a gas turbine engine. As an example, oil is provided to a number of components which rotate. The oil is heated, and is typically then passed through a heat exchanger where it may be cooled by a secondary fluid. While oil cooling heating exchangers are specifically mentioned, other fluids, such as air may also be cooled in gas turbine engine heat exchangers. Improvements are always desirable in the gas turbine engine space.

SUMMARY

A gas turbine engine includes a compressor section and a turbine section. A heat exchanger is operable to cool a fluid utilized by a component of the gas turbine engine. The heat exchanger has an inlet and an outlet. A strain gauge is associated with the fluid inlet and operable to produce a signal indicative of a temperature of the fluid at the fluid inlet and a strain gauge is associated with the fluid outlet and operable to produce a signal indicative of a temperature of the fluid at the fluid outlet. A controller determines a temperature differential across the heat exchanger by utilizing the signal from the strain gauge at the fluid inlet and the signal from the strain gauge at the fluid outlet.

A heat exchanger and a method are also disclosed.

These and other features will be best understood from the following drawings and specification, the following is a brief description.

DETAILED DESCRIPTION

Figure 1:
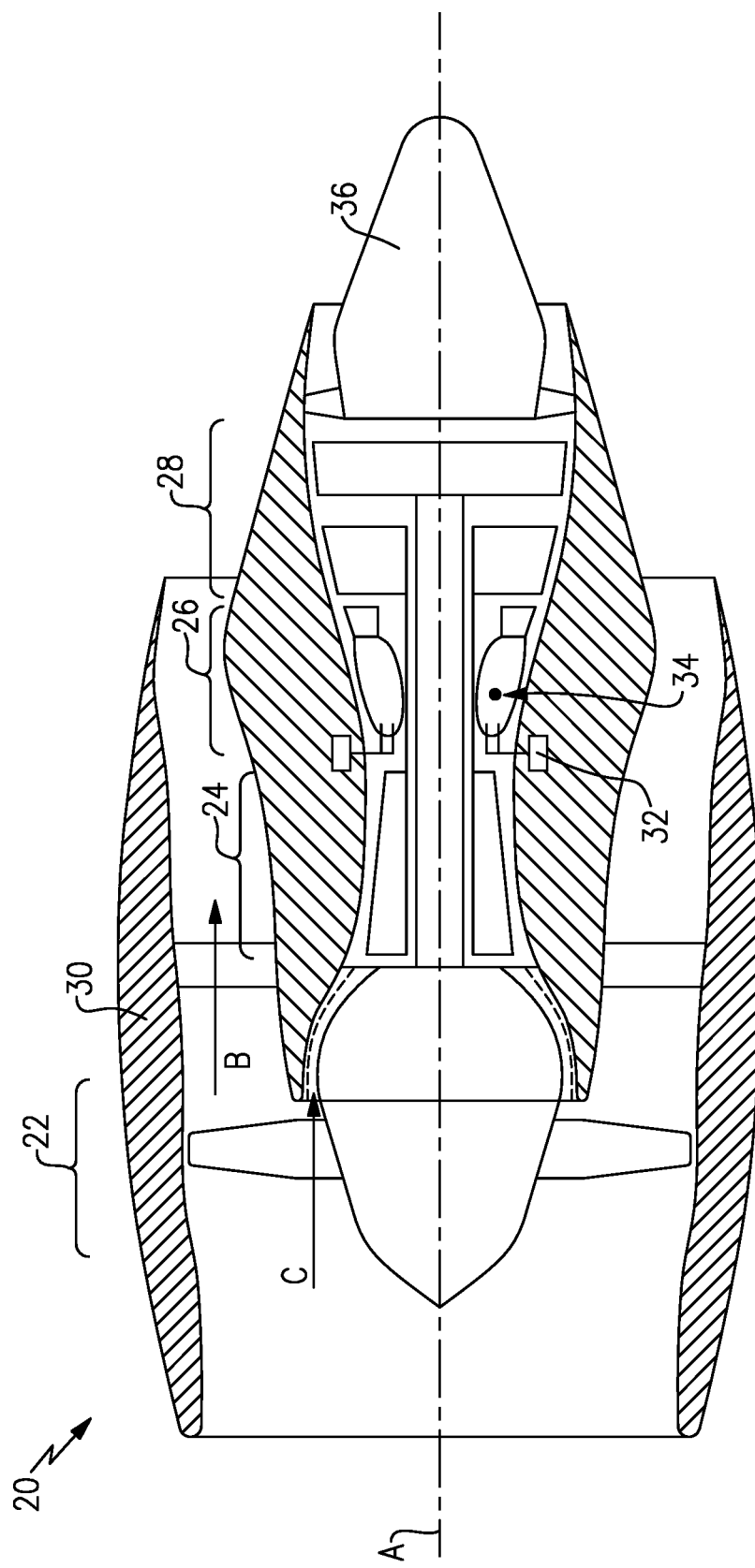
FIG. 1 schematically shows a gas turbine engine.

FIG. 1 schematically illustrates a gas turbine engine 20. The example gas turbine engine 20 is a turbofan that generally incorporates a fan section 22, a compressor section 24, a combustor section 26 and a turbine section 28. The fan section 22 drives air along a bypass flow path B in a bypass duct defined within a nacelle 30. The turbine engine 20 intakes air along a core flow path C into the compressor section 24 for compression and communication into the combustor section 26. In the combustor section 26, the compressed air is mixed with fuel from a fuel system 32 and ignited by igniter 34 to generate an exhaust gas flow that expands through the turbine section 28 and is exhausted through exhaust nozzle 36. Although depicted as a turbofan turbine engine in the disclosed non-limiting embodiment, it should be understood that the concepts described herein are not limited to use with turbofans as the teachings may be applied to other types of turbine engines. As one example, rather than having the propulsor be an enclosed fan, the propulsor may be an open propeller. This embodiment can also be applied to industrial gas turbine engine as well.

Figure 2:
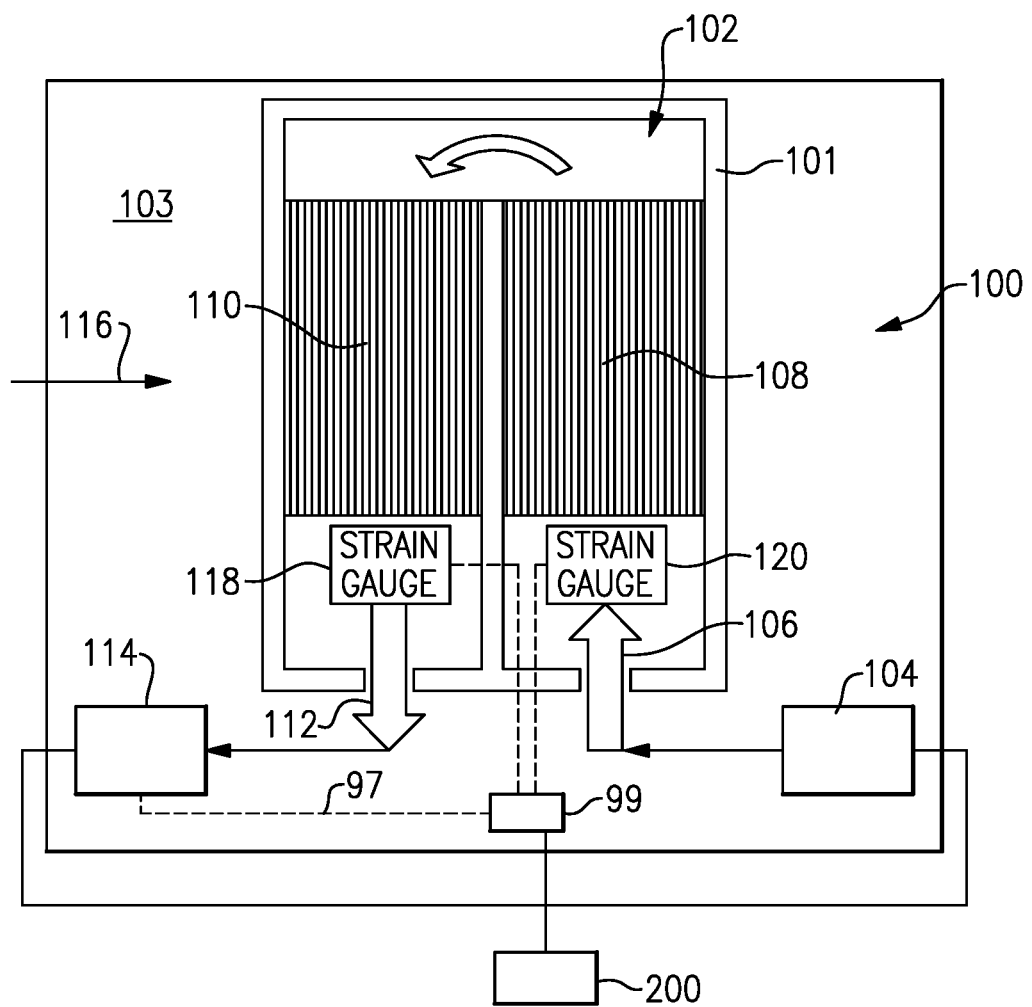
FIG. 2 shows a fluid system on a gas turbine engine.

FIG. 2 shows a fluid circuit 100 which may be incorporated into a gas turbine engine such as the engine show in FIG. 1. A heat exchanger 102 has a wall 101 defining an internal fluid passage. The heat exchanger 102 sits in a chamber 103. As one example, chamber 103 may be a bypass duct, however, other chambers may receive the heat exchanger 102.

A lubricant is returned from a system 104 that has been lubricated. As an example, bearing cases, gear reductions, etc. require lubrication. This oil is hot and is delivered through an inlet 106 across a cooling matrix 108 in the heat exchanger 102. The oil is cooled by air 116 passing across the heat exchanger 102. The oil then returns through a cooling matrix 110 to an outlet 112. From outlet 112 the cooled oil is returned to a lubricant system 114. As an example, lubricant system 114 may include a lubricant sump, a lubricant pump, etc. At some location on the lubricant system 114 a mean oil temperature ("MOT") is determined. This oil temperature is utilized for any number of operational control calculations.

Strain gauges 118 and 120 are positioned to be associated with the inlet 106 and the outlet 112.

Figure 3:
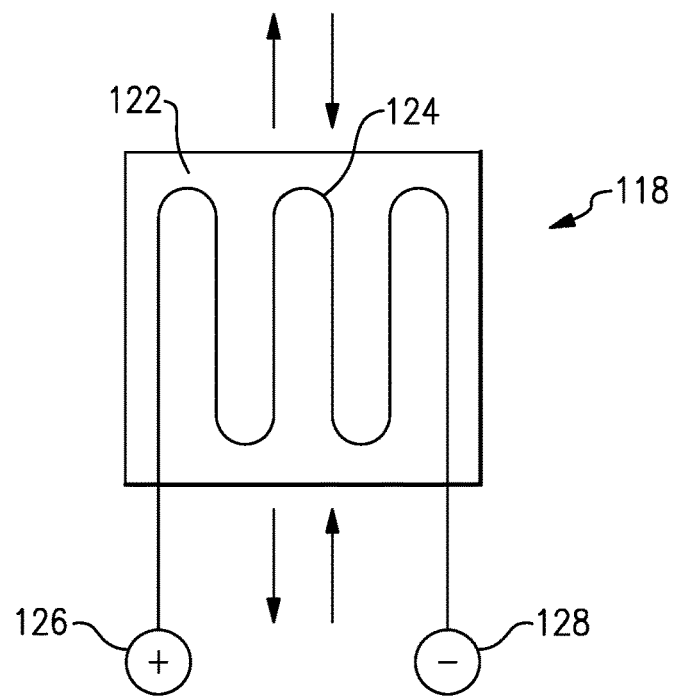
FIG. 3 shows a strain gauge.

Strain gauges are typically utilized to determine strain in a component. As an example, a strain gauge 118 is shown in FIG. 3 having a substrate 122 of a known typically non-conductive, material. An electric circuit, trace or collectively, an electric conductor member 124 is also formed on the substrate 122. The electric conductor member 124 extends between terminals 126 and 128 such that a voltage is applied across the strain gauge 118. Known strain gauges operate to determine elongation of the substrate 122 such as may be caused by tension or compression.

The strain gauges 118 and 120 may provide a strain measuring function in the heat exchanger 102. However, in this disclosure they are utilized to determine a differential temperature across the heat exchanger. Thus, by determining a difference in strain between strain gauge 120 and 118 the temperature differential ("delta T" or "ΔT") can be accurately determined.

Strain gauges 118 and 120 are shown communicating with an electronic controller 99. Controller 99 also receives a signal 97 to determine a MOT. Controller 99 communicates with a signal 200 such as a cockpit warning or a maintenance signal.

Figure 4:
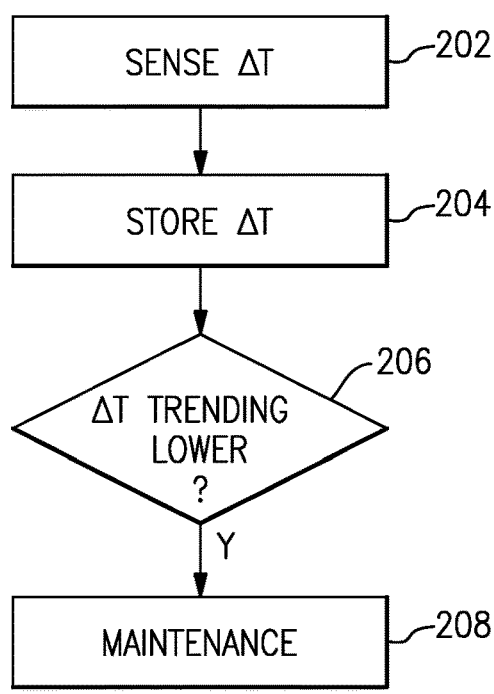
FIG. 4 is a flow chart describing a method according to this disclosure.

The temperature differential can be utilized for diagnostic purposes. As one example shown in FIG. 4, the delta temperature is sensed at 202 and stored at 204. If it is determined that the delta temperature is trending to be lower at step 206 then maintenance may be indicated at step 208. As an example, if the temperature differential is decreasing that would generally indicate that the heat exchanger 102 is not functioning as efficiently as it previously was. This could be caused by dirty fins such as in the cooling matrix 108 or 110. Further, it may be indicative of broken components or an airflow 116 that is too low. At any rate, maintenance may be indicated with a signal to element 200.

Further, if the temperature differential shows heating, that is, the temperature sensed at strain gauge 118 is actually higher than the temperature sensed at the hot strain gauge 120 this could be indicative of a fire associated with the engine heating the airflow 116.

Further, coupling the differential temperature measurement with the MOT signal and interpolating using known models, specific oil temperatures at the heat exchanger 102 can be calculated for operational checks or even operating limit monitoring.

The "known model" is referring to an oil system model where the thermodynamics of the oil has been studied (analytically, or through testing) to correlate expected temperatures at different places in the oil system. For example: if the oil system is comprised of an air cooled oil cooler (ACOC), a fuel cooler oil cooler (FCOC) and then a MOT sensor, each connected by a particular length, type and geometry of tube, the model may show, as examples: (1) at the ACOC, 100 degree oil at the inlet and 90 degrees at the outlet, 50 degrees at the FCOC inlet and 45 degree at the MOT temperature sensor for a particular operating condition. This relationship is confirmed during engine testing with sensors that would not be in a production engine/aircraft. Knowing these temperature relationships, one can determine that if 45 degree is the MOT, it should be 100 degrees going into the ACOC. If the MOT is 50 degree, it should be 105 degrees coming into the ACOC. If one sees it is over 100 degree expected temp, perhaps it is 5 degree over the operating limit.

The differential oil temperature can also be coupled with a measured ambient temperature and known flow correlations for calculations of specific heat exchanger oil temperature. This could serve as a backup temperature signal to be supplied to controls. The increased reliability of the temperature signal could in turn allow cost or weight savings in other components providing an overall engine cost and weight savings.

For an ACOC, there is a heat transfer from oil to air to cool down the oil. We know that energy out of the oil, measured by drop in temperature is the same as the energy put into the air, again, change in temperature of the air. After studying and characterizing the ACOC performance, we can know that for a given airflow (mass flow, inlet temperature, etc.) how much energy/cooling can be expected from the ACOC. So for example: at a given operating condition, say Ground idle there should be 15 degree air flowing through the ACOC at a certain speed, oil of 100 degree going into the ACOC and comes out at 90 degrees due to cooling (10 deg temp drop. This can be theoretically measured in a lab during testing. In actual aircraft operation one measures air temp and oil differential temperature and can assume other conditions from previous testing data. So if one sees a 10 degree temp drop in the oil, one knows that it is running at 100 degree oil in and 90 degree oil out. This calculates an absolute oil temperature by correlating air temp and differential oil temp.

While this disclosure is with regard to an air oil cooling heat exchanger, other heat exchangers cooling other fluids may benefit from the teachings of this disclosure.

The strain gauges may be positioned in any number of locations in the heat exchanger where they will "see" the hot and cooled fluid.

A gas turbine engine 20 under this disclosure could be said to include a compressor section and a turbine section. A heat exchanger 102 is operable to cool a fluid utilized by a component of the gas turbine engine. The heat exchanger has an inlet 106 and an outlet 112. A strain gauge is associated with the fluid inlet and operable to produce a signal indicative of a temperature of the fluid at the fluid inlet and a strain gauge is associated with the fluid outlet and operable to produce a signal indicative of a temperature of the fluid at the fluid outlet. A controller determines a temperature differential across the heat exchanger by utilizing the signal from the strain gauge at the fluid inlet and the signal from the strain gauge at the fluid outlet.

If an indication of maintenance is indicated this can be utilized to forecast maintenance or, as an example, to provide a signal to a cockpit in an associated aircraft such as shown schematically at 200 (see FIG. 2).

In another embodiment according to the previous embodiment, an accessory fluid for a component on the gas turbine engine is passed through the heat exchanger to be cooled by a cooling fluid.

In another embodiment according to any of the previous embodiments, the accessory fluid is oil and the cooling fluid is air.

In another embodiment according to any of the previous embodiments, each of the strain gauges at the inlet and the outlet include a conductor member 124 mounted on a substrate 122 and a voltage applied across the conductor member, such that as the substrate expands and contracts the conductor member is deformed and a voltage change can be determined and a difference between a voltage change at the inlet strain gauge compared to a voltage change at the outlet strain gauge can be utilized to determine the temperature differential.

In another embodiment according to any of the previous embodiments, the controller storing the temperature differential, the controller further being programmed to determine if the temperature differential is trending in a manner indicating a need for maintenance.

In another embodiment according to any of the previous embodiments, if the temperature differential is trending low an indication that the heat exchanger needs maintenance is made.

In another embodiment according to any of the previous embodiments, if the signal from the strain gauge associated with the outlet indicates a higher temperature than the signal from the strain gauge associated with the inlet, a determination may be made that there may be a fire associated with the gas turbine engine.

In another embodiment according to any of the previous embodiments, the temperature differential is utilized with other variables to determine an actual oil temperature.

A method of operating a gas turbine engine under this disclosure could be said to include moving an accessory fluid to a component in a gas turbine engine, fluidly downstream of the component. The accessory fluid is passed through a heat exchanger via a fluid inlet of the heat exchanger and out of a fluid outlet of the heat exchanger. A strain of the heat exchanger is sensed at the fluid inlet and senses a strain of the heat exchanger at the fluid outlet. A temperature differential is determined across the heat exchanger based on the strains at the fluid inlet and the fluid outlet. The determined temperature differential is utilized for a diagnostic purpose.

In another embodiment according to any of the previous embodiments, the accessory fluid is oil having lubricated the component.

In another embodiment according to any of the previous embodiments, the cooling fluid is air.

In another embodiment according to any of the previous embodiments, the strain at each of the fluid inlet and fluid outlet is determined with a conductor member 124 mounted on a substrate 122 and a voltage applied across the conductor member, such that as the substrate expands and contracts the conductor member is deformed and a voltage change can be determined and a difference between a voltage change at the strain gauge at the inlet compared to a voltage change at the strain gauge at the outlet can be utilized to determine the temperature differential.

In another embodiment according to any of the previous embodiments, the diagnostic purpose is determining if the temperature differential is trending in a manner indicating a need for maintenance.

In another embodiment according to any of the previous embodiments, if the temperature differential is trending low an indication that the heat exchanger needs maintenance is made.

In another embodiment according to any of the previous embodiments, if the strain of the heat exchanger at the fluid outlet indicates a higher temperature than the strain of the heat exchanger at the fluid inlet, determining that there may be a fire associated with the gas turbine engine.

In another embodiment according to any of the previous embodiments, the diagnosis purpose is to determine an actual oil temperature.

A heat exchanger under this disclosure could be said to include a heat exchanger operable to cool a fluid and the heat exchanger having an inlet and an outlet for the fluid. A hot gauge is associated with the fluid inlet and operable to produce a signal indicative of a temperature at the fluid inlet and a strain gauge is associated with the fluid outlet and operable to produce a signal indicative of a temperature at the fluid outlet. A controller determines a temperature differential across the heat exchanger by utilizing the signal.

In another embodiment according to any of the previous embodiments, each of the strain gauges at the inlet and the outlet include a conductor member 124 mounted on a substrate 122 and a voltage applied across the conductor member, such that as the substrate expands and contracts the conductor member is deformed and a voltage change can be determined and a difference between a voltage change at the inlet strain gauge compared to a voltage change at the outlet strain gauge can be utilized to determine the temperature differential.

In another embodiment according to any of the previous embodiments, the controller storing the temperature differential, the controller further being programmed to determine if the temperature differential is trending in a manner indicating a need for maintenance.

In another embodiment according to any of the previous embodiments, the controller storing the temperature differential, the controller further being programmed to determine if the temperature differential is trending in a manner indicating a need for maintenance.

While the heat exchanger is disclosed in a gas turbine engine the teachings of this disclosure extend to other heat exchanger applications.

Although embodiments have been disclosed, a worker of skill in this art would recognize that modifications would come within the scope of this disclosure. For that reason, the following claims should be studied to determine the true scope and content.

What is claimed is:

1. A gas turbine engine comprising:
a compressor section and a turbine section;
a heat exchanger operable to cool a fluid utilized by a component of the gas turbine engine, the heat exchanger having a fluid inlet and a fluid outlet;
a strain gauge associated with the fluid inlet and operable to produce a signal indicative of a temperature of the fluid at the fluid inlet and a strain gauge associated with the fluid outlet and operable to produce a signal indicative of a temperature of the fluid at the fluid outlet, and a controller for determining a temperature differential across the heat exchanger by utilizing the signal from the strain gauge at the fluid inlet and the signal from the strain gauge at the fluid outlet; and
wherein each of the strain gauges at the fluid inlet and the fluid outlet include a conductor member mounted on a substrate and a voltage applied across the conductor member, such that as the substrate expands and contracts the conductor member is deformed and a voltage change can be determined and a difference between a voltage change at the strain gauge associated with the fluid inlet compared to a voltage change at the strain gauge associated with the fluid outlet can be utilized to determine the temperature differential.

2. The gas turbine engine as set forth in claim 1, wherein an accessory fluid for a component on the gas turbine engine is passed through the heat exchanger to be cooled by a cooling fluid.

3. The gas turbine engine as set forth in claim 2, wherein the accessory fluid is oil and the cooling fluid is air.

4. The gas turbine engine as set forth in claim 1, wherein the controller storing the temperature differential, the controller further being programmed to determine if the temperature differential is trending in a manner indicating a need for maintenance.

5. The gas turbine engine as set forth in claim 4, wherein if the temperature differential is trending low an indication that the heat exchanger needs maintenance is made.

6. The gas turbine engine as set forth in claim 1, wherein if the signal from the strain gauge associated with the fluid outlet indicates a higher temperature than the signal from the strain gauge associated with the fluid inlet, a determination may be made that there may be a fire associated with the gas turbine engine.

7. The gas turbine engine as set forth in claim 1, wherein the temperature differential is utilized with other variables to determine an actual oil temperature.

8. A method of operating a gas turbine engine comprising:
moving an accessory fluid to a component in a gas turbine engine;
fluidly downstream of the component, passing the accessory fluid through a heat exchanger via a fluid inlet of the heat exchanger and out of a fluid outlet of the heat exchanger;
sensing a strain of the heat exchanger at the fluid inlet and sensing a strain of the heat exchanger at the fluid outlet;
determining a temperature differential across the heat exchanger based on the strains at the fluid inlet and the fluid outlet; and
utilizing the determined temperature differential for a diagnostic purpose; and
wherein the strain at each of the fluid inlet and fluid outlet is determined with a conductor member mounted on a substrate and a voltage applied across the conductor member, such that as the substrate expands and contracts the conductor member is deformed and a voltage change can be determined and a difference between a voltage change at the strain gauge at the inlet compared to a voltage change at the strain gauge at the outlet can be utilized to determine the temperature differential.

9. The method as set forth in claim 8, wherein the accessory fluid is oil having lubricated the component.

10. The method as set forth in claim 9, wherein air is passed over the heat exchanger to cool the oil.

11. The method as set forth in claim 8, wherein the diagnostic purpose is determining if the temperature differential is trending in a manner indicating a need for maintenance.

12. The method as set forth in claim 11, wherein if the temperature differential is trending low an indication that the heat exchanger needs maintenance is made.

13. The method as set forth in claim 8, wherein if the strain of the heat exchanger at the fluid outlet indicates a higher temperature than the strain of the heat exchanger at the fluid inlet, the diagnostic purpose is a determining that there may be a fire associated with the gas turbine engine.

14. The method as set forth in claim 8, wherein the diagnosis purpose is to determine an actual oil temperature.

15. A heat exchanger comprising:
   a heat exchanger operable to cool a fluid and the heat exchanger having an inlet and an outlet for the fluid; and
   a strain gauge associated with the fluid inlet and operable to produce a signal indicative of a temperature at the fluid inlet and a strain gauge associated with the fluid outlet and operable to produce a signal indicative of a temperature at the fluid outlet, and a controller for determining a temperature differential across the heat exchanger by utilizing the signals from the fluid inlet and fluid outlet; and
   wherein each of the strain gauges at the fluid inlet and the fluid outlet include a conductor member mounted on a substrate and a voltage applied across the conductor member, such that as the substrate expands and contracts the conductor member is deformed and a voltage change can be determined and a difference between a voltage change at the strain gauge associated with the fluid outlet compared to a voltage change at the strain gauge associated with the fluid inlet can be utilized to determine the temperature differential.

16. The heat exchanger as set forth in claim 15, wherein the controller storing the temperature differential, the controller further being programmed to determine if the temperature differential is trending in a manner indicating a need for maintenance.

* * * * *